(12) United States Patent
Lee

(10) Patent No.: US 6,724,697 B2
(45) Date of Patent: Apr. 20, 2004

(54) LAYER JUMP CONTROL APPARATUS OF MULTILAYER DISK AND METHOD THEREOF

(75) Inventor: Jong Hyeok Lee, Pyungtaek (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 09/809,324

(22) Filed: Mar. 16, 2001

(65) Prior Publication Data

US 2001/0030916 A1 Oct. 18, 2001

(30) Foreign Application Priority Data

Mar. 16, 2000 (KR) .................................. 2000/13443

(51) Int. Cl.$^7$ .................................................. G11B 7/00
(52) U.S. Cl. ................................ 369/44.27; 369/44.28; 369/44.25; 369/53.1; 369/93
(58) Field of Search ........................... 369/44.27, 44.25, 369/44.28, 44.29, 44.26, 44.34, 44.35, 44.37, 47.1, 53.1, 53.28, 93, 94, 275.1; 250/201.5

(56) References Cited

U.S. PATENT DOCUMENTS

| | | |
|---|---|---|
| 5,974,009 A | 10/1999 | Tamura et al. |
| 6,178,145 B1 * | 1/2001 | Hayashi et al. .......... 369/44.29 |
| 6,246,646 B1 | 6/2001 | Abe et al. |
| 6,246,647 B1 * | 6/2001 | Tsutsui et al. .......... 369/44.29 |
| 6,307,820 B2 * | 10/2001 | Takeya et al. .......... 369/44.29 |
| 6,480,444 B2 * | 11/2002 | Tada et al. ............... 369/44.27 |

FOREIGN PATENT DOCUMENTS

| | | |
|---|---|---|
| EP | 0 807 926 A1 | 11/1997 |
| JP | 11039665 | 2/1999 |
| JP | 11250468 | 9/1999 |

* cited by examiner

Primary Examiner—Muhammad Edun
(74) Attorney, Agent, or Firm—Birch, Stewart, Kolasch & Birch, LLP

(57) ABSTRACT

The present invention relates to a layer jump control apparatus of a multilayer disk and a method thereof, when a layer jump request between record layers of the multilayer disk is inputted from outside, a sled, a tracking, and a focusing servo are converted into inactive state, a microcomputer sets an operation voltage of an inner focus lens of an optical pickup to allotted ports in order to transfer the focus lens vertically to the layer jump request direction. The present invention is capable of jumping accurately and rapidly on a request layer of the multilayer disk by jumping on a target layer of the multilayer disk accurately by converting the focusing servo into active state at the jump position of the focus lens on the basis of a FOK signal and a FZC signal detected in accordance with transferring operation, and adjusting vertical transferring speed of an optical pickup by considering minus offset of the optical pickup.

13 Claims, 11 Drawing Sheets

FIG. 5

|  | LAYER VD0 | LAYER VD1 |
|---|---|---|
| LENS UP | L | L |
| LENS STOP | L | H |
| LENS DOWN | H | H |

FIG. 6

|     | LENS UP(R1) |      | LENS DOWN(R2) |      |
|-----|-------------|------|---------------|------|
| (a) | 82KΩ        | 0.9V | 22KΩ          | 1.8V |
| (b) | 68KΩ        | 1.1V | 47KΩ          | 1.8V |
| (c) | 56KΩ        | 1.3V | 56KΩ          | 1.6V |
| (d) | 22KΩ        | 1.8V | 68KΩ          | 1.5V |

LAYER JUMP CONTROL APPARATUS OF MULTILAYER DISK AND METHOD THEREOF

BACKGROUND OF THE INVENTION

1. Field of the Invention

The present invention relates to a layer jump control apparatus of a multilayer disk and a method thereof, in particular to a layer jump control apparatus of a multilayer disk and a method thereof which is capable of jumping accurately and rapidly on a request position by setting operation voltage variably in order to jump on a layer of the multilayer disk having at least two different record layers.

2. Description of the Prior Art

In general, an optical disk operation apparatus embodies a video and an audio by reading data recorded on the optical disk with optical pickup and releasing compression by processing the read signal.

The optical pickup reads the needed data by throwing laser on a set position of the optical disk and picking up the optical light.

In the present times, a DVD (Digital Versatile Disk) has spread as the optical disk. The digital versatile disk is the multilayer disk having at least two layers, and it can store larger amount of data than the conventional optical disk.

Meanwhile, in order to read the data recorded on the multilayer disk by the optical pickup, it can be transferred to each layer. In order to make an optical pickup 20 jump on the other layer, when a focus servo operation is OFF, the optical pickup can jump on the other layer by ascending an inner focus lens of the optical pickup rapidly by influence of a minus offset maintained itself.

However, in the above-mentioned method, because the inner focus lens of the optical pickup ascends rapidly, it passes a target layer.

It is possible to solve above-mentioned problem by performing the servo operation while ascending the focus lens slowly after descending the focus lens sufficiently.

The construction and operation of the above-described optical disk will now be described as below.

FIG. 1 is a block diagram illustrating a construction of a general optical disk apparatus. It comprises a multilayer disk 10 having at least two record layers, an optical pickup 20 for reading data recorded on the multilayer disk 10, a spindle motor 50 for rotating the multilayer disk 10, a RF unit 30 for generating a servo error signal (namely, a tracking error, hereinafter, it is referred to TE) and a focusing error (hereinafter, it is referred to FE) from a signal detected from the optical pickup 20 and outputting a binary signal by performing wave-filtering of a regenerative RF (radio Frequency) signal, a drive unit 60 for operating the spindle motor 50 and optical pickup 20, a digital signal processing unit 40 for restoring the binary signal outputted from the RF unit 30 into the original data and controlling the operation of the drive unit 60 by the TE and FE signal, and a microcomputer 70 for outputting a control order to the digital signal processing unit 50.

The operation of the above-described general optical disk apparatus will now be described.

When the regenerative signal is inputted to the microcomputer 70 from outside, the microcomputer 70 operates the spindle motor 50 by controlling the drive unit 60, and operates the multilayer disk 10. In addition, the microcomputer 70 detects a reflected light by controlling the optical pickup 20. The detected signal is inputted to the RF unit 30. The RF unit generates the TE, FE, and regenerative FR signals by the inputted signal. When the focusing and tracking error signals are inputted to the microcomputer 70, the microcomputer 70 transmits the control signal to the digital signal processing unit 40 by the inputted error signal. The digital signal processing unit 40 controls the optical pickup 20 through the drive unit 60 in accordance with the inputted control signal. The optical pickup determines a target record layer and a track by the inputted control signal.

The data recorded on the multilayer disk 10 is read by the above-described processes, is converted into regenerative data in the digital signal processing unit 40, and is outputted.

The operation when a layer up/down order is applied to the multilayer disk drive operation apparatus will now be described in detail with reference to accompanying FIGS. 2 and 3.

FIG. 2 is a construction profile illustrating a focusing actuator for operating the inner focusing lens of the optical pickup in the general multilayer disk, the position of the focusing lens is adjusted by the voltage applied to the focusing actuator, it can jump on the other layer of the multilayer disk.

FIG. 3 is a flow chart illustrating a layer jump operation of the conventional optical disk operating apparatus. When a layer jump order is inputted from the outside to the microcomputer 70 S81, the microcomputer 70 turns off the tracking and sled servo operation of the optical pickup 20 S82, and delays about for 5 msec in order to stabilize the optical pickup 20 S83.

The servo is the apparatus for adjusting automatically the optical pickup on an adjustable position of the multilayer disk. It can be divided into the tracking servo, sled servo, and focusing servo.

The tracking servo adjusts the optical pickup 20 accurately on a pit of a target track of the multilayer disk by adjusting it to left/right direction on the basis of the tracking error signal generated and outputted from the RF unit 30.

The sled servo adjusts the position of the request track by adjusting the optical pickup 20 to radial direction from the center of the multilayer disk.

The focusing servo adjusts the optical pickup 20 to vertical direction on the basis of the focusing error signal generated and outputted form the RF unit 30.

Meanwhile, after 5 msec passes, the microcomputer 70 turns off the focusing servo operation S84, and delays for 5 msec in order to stabilize the optical pickup 20.

By the above-described process, when the all servo operation is OFF, the microcomputer 70 transmits an instruction word $02 for layer jump to the digital signal processing unit 40.

The instruction word $02 is for descending the focus lens of the optical pickup vertically.

The digital signal processing unit 40 applies the focusing servo control voltage to the drive unit 60 by the inputted instruction word $02. The drive unit 60 controls to make the inner focus lens of the optical pickup 20 descend vertically for about 100 msec by the applied control voltage.

When the focus lens descends, the microcomputer 70 outputs an ascendant instruction word $03 of the focus lens of the optical pickup 20 to the digital signal processing unit 40.

The instruction word $03 is for ascending the focus lens of the optical pickup 20.

The digital signal processing unit 40 applies the operation voltage for ascending the focus lens of the optical pickup 20 to the drive unit 60 by the inputted instruction word.

The drive unit 60 applies the applied operation voltage to the focus actuator (depicted in FIG. 2) of the inner focus lens of the optical pickup 20, and ascends the focus lens vertically for about 20 msec S87.

As described above, when the focus lens moves, the microcomputer 70 transmits an instruction word $08 for turning on the focusing servo to the digital signal processing unit 40 S88.

The digital signal processing unit 40 transmits continually a FOK (Focus Okay) signal and a sense signal to the microcomputer 70. Because the transmitted signals are generated in order to jump on a superior record layer, the microcomputer 70 ignores the FOK signal and sense signal about the first layer among the transmitted signal, and observes continually the FOK signal and sense signal about the second layer.

The FOK (Focus Okay) signal is a signal which is outputted when the focusing operation of the focus lens is performed normally. The sense signal is a signal outputted from a sense circuit of the digital signal processing unit 40, its output is differentiated in accordance with a command on a microcomputer serial register, it is referred as a FZC (Focus Zero Crossing) for the focus servo control in the present invention.

When the digital signal processing unit 40 outputs the FOK signal and sense signal as high to the microcomputer 70 S89, the microcomputer 70 detects a descendant edge time point of the sense signal, and controls the digital signal processing unit 40 in order to make the focusing servo operation about the superior layer turn on in accordance with the transmitted instruction word $08, the requested layer jump operation is finished.

However, in the layer jump method on the multilayer disk, when a jump request occurs, the focus servo operation is performed while ascending the lens slowly after descending the focus lens sufficiently, accordingly long time for about 200 msec is required in the layer jump on the multilayer disk.

In order to solve above-mentioned problems, a DSP (Digital Signal Processing) chip for focus up/down is used for the some optical operation apparatus. The DSP chip is used only in focus up/down for making focus at initial times, and it is set as a too low value for the focus operation voltage for plural layers focus control, accordingly it is difficult to perform accurate control and the time can be delayed.

SUMMARY OF THE INVENTION

The object of the present invention is to provide a layer jump control apparatus of a multilayer disk and a method thereof which is capable of jumping on a request position accurately and rapidly by setting variably operation voltage inputted to an optical pickup operating the multilayer disk. The other object of the present invention is to provide a layer jump control apparatus of a multilayer disk and a method thereof which is capable of controlling jump accurately and rapidly by adjusting appropriately kick/brake time in layer jump.

In order to achieve the objects of the present invention, the embodiment of the present invention comprises an optical pickup including an object lens reading data recorded on a disk having at least two layers, a digital signal processing unit for outputting a control signal for focus servo control from a signal read from the optical pickup, and restoring the original signal from the read signal, a control unit for outputting a control order for layer jump to the digital signal processing unit in the layer jump, controlling focusing operation of a target layer from the signal outputted from the digital signal processing unit in accordance with the control order, and outputting a different control signal in accordance with the target layer transferring position, and an operation voltage unit for operating variably the focus lens of the optical pickup by the control signal outputted from the control unit.

The embodiment of the present invention comprises converting a focusing servo into inactive state when a layer jump request between record layers of the multilayer disk is inputted from outside, performing vertical transferring of the focus lens to the layer jump request position by setting variably the operation voltage of an inner focus lens of an optical pickup, and converting the focusing servo into active state on the present position of the focus lens on the basis of a FOK signal and a FZC signal detected in accordance with the transferring operation.

The other embodiment of the present invention comprises a reader for reading data recorded on a disk having at least two layers, a servo control unit for outputting a signal for controlling vertical transferring time of the reader from the signal outputted from the reader, an operation unit for operating the reader in accordance with a signal outputted from the servo control unit, and a control unit for controlling the servo control unit for focusing of the pertinent layer in layer jump request of the disk, and controlling the operation unit for outputting a variable voltage in accordance with a target layer transferring position.

The another embodiment of the present invention comprises confirming whether there is a layer jump request, transferring a pickup to the pertinent layer to the vertical direction in the layer jump request, and controlling the transferring speed to the vertical direction in accordance with a signal outputted by the transferring of the pickup.

BRIEF DESCRIPTION OF THE DRAWINGS

FIG. 5 illustrates relation of voltage level inputted to ports allotted from a microcomputer in accordance with the present invention.

FIG. 6 illustrates a variable resistance value for adjusting interval of kick pulse time.

DETAILED DESCRIPTION OF THE
PREFERRED EMBODIMENT

A layer jump operation on a DVD (Digital Versatile Disk) will now be described in detail with reference to accompanying drawings.

Figure 1:
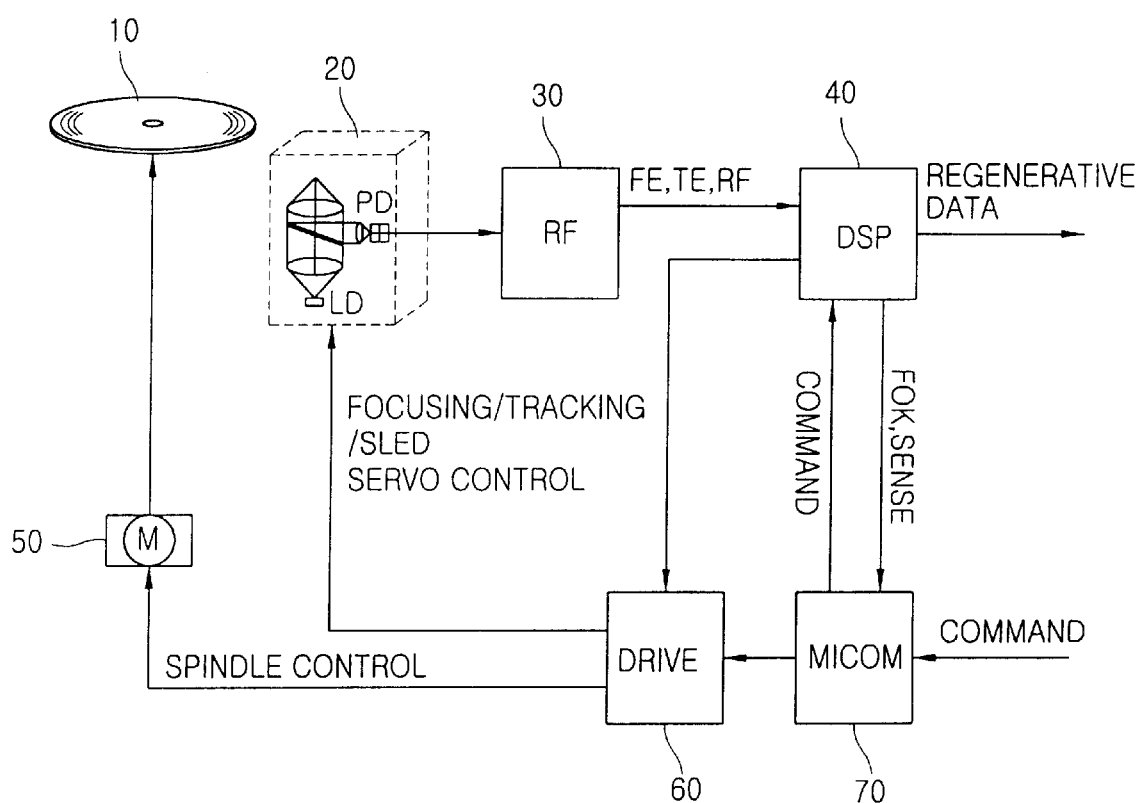
FIG. 1 is a block diagram illustrating a construction of a general optical disk operation apparatus.
Figure 2:
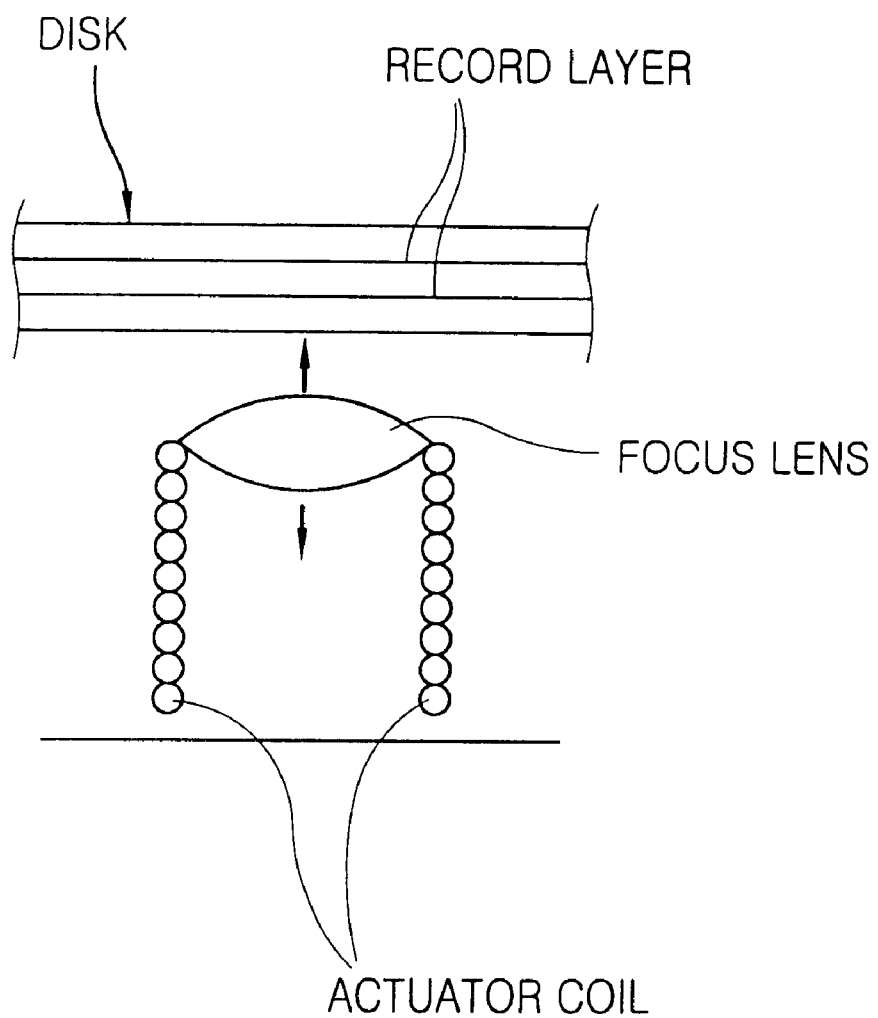
FIG. 2 is a construction profile illustrating a focusing actuator operating a focusing lens on a general multilayer disk.
Figure 3:
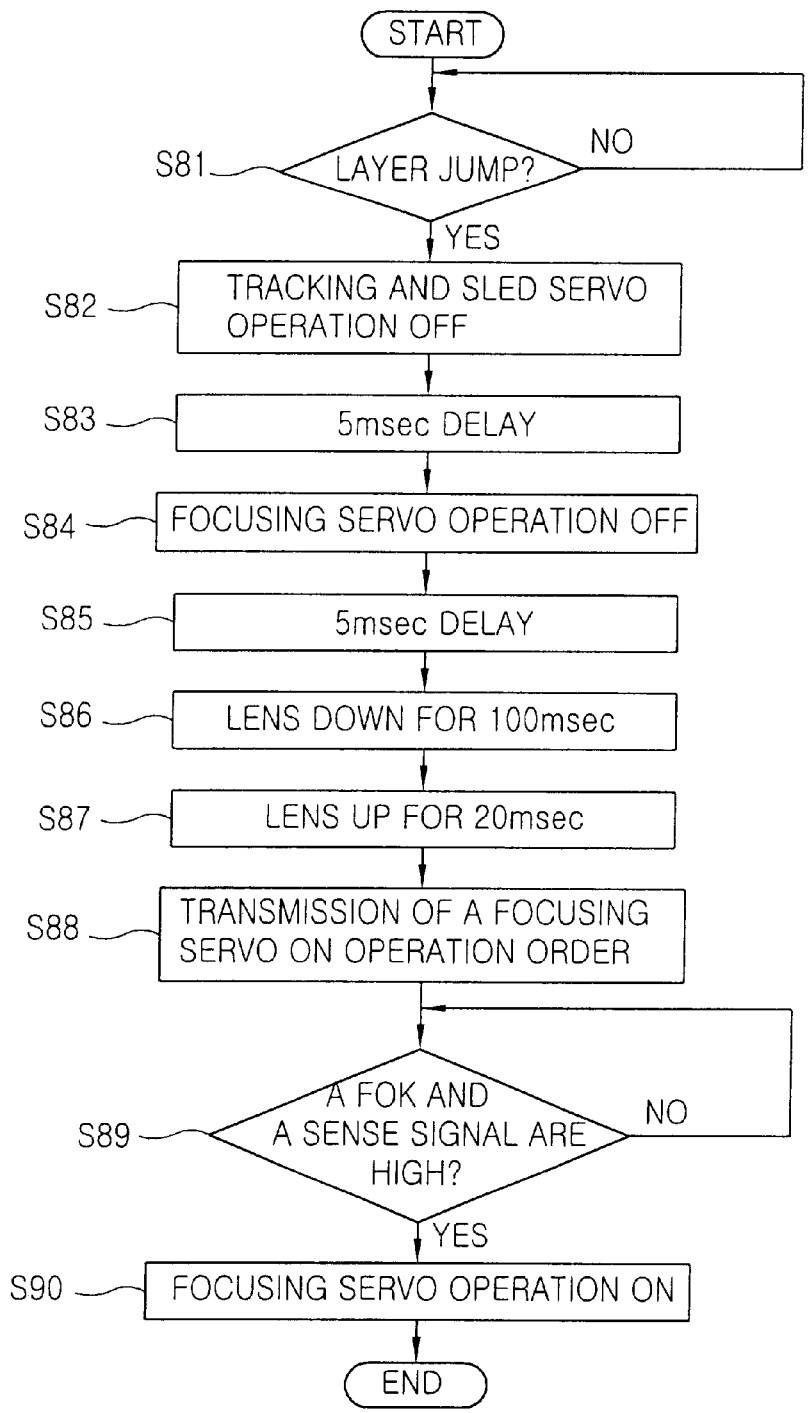
FIG. 3 is a flow chart illustrating layer jump operation on the optical disk operating apparatus in accordance with the conventional technology.
Figure 4:
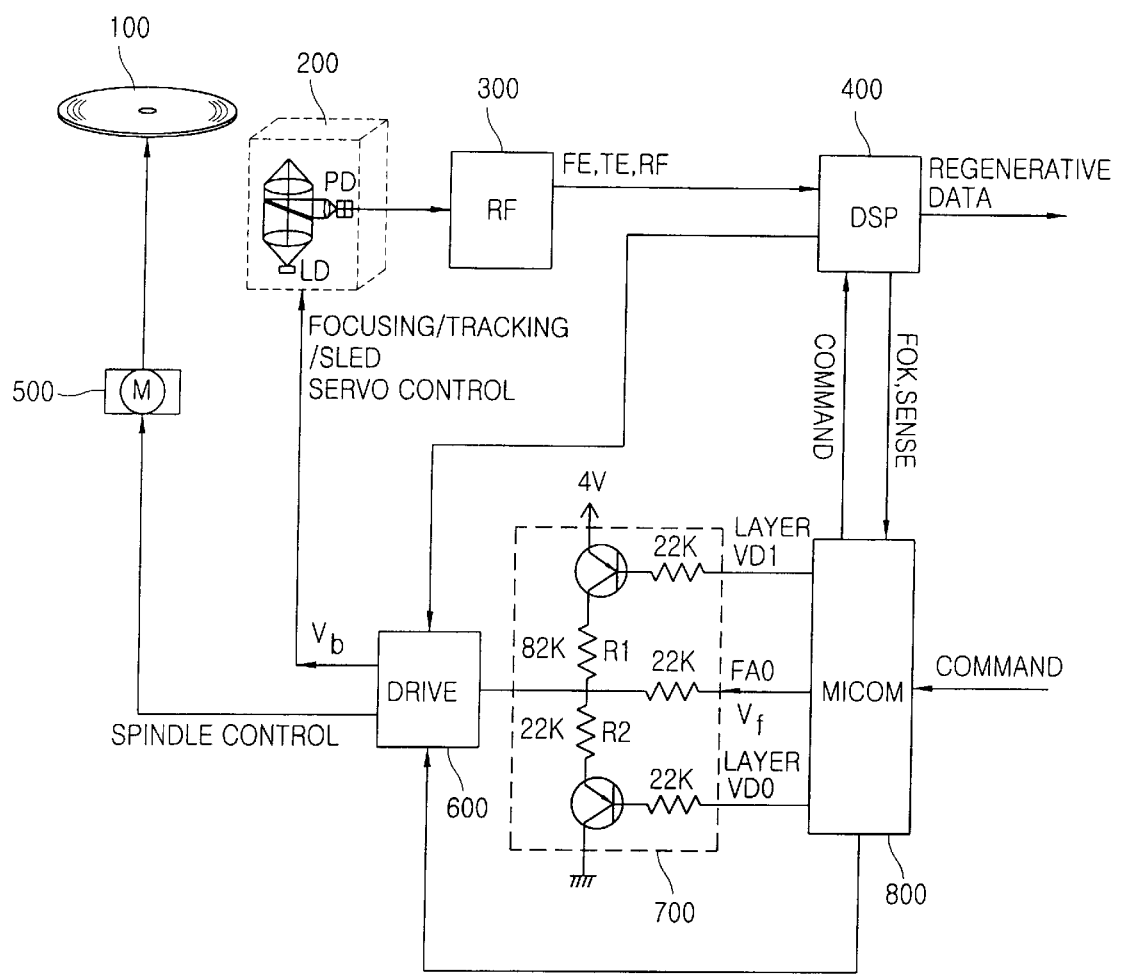
FIG. 4 is a block diagram illustrating a construction of a layer jump control apparatus on a multilayer disk in accordance with the present invention.

FIG. 4 is a block diagram illustrating a construction of a layer jump control apparatus on a multilayer disk in accordance with the present invention. It comprises a multilayer disk 100 having at least two record layers, a spindle motor 500 for rotating the multilayer disk, an optical pickup 200 for reading data recorded on the multilayer disk 100, a RF unit 300 for generating a servo error signal and a regenerative RF signal by a signal read from the optical pickup 200 and outputting a binary signal by wave-filtering the regeneratuve RF signal, a digital signal processing unit 400 for controlling operation of a drive unit 600 by the outputted servo error signal, a drive unit 600 for operating the spindle motor 500 and optical pickup 200, a microcomputer 800 for outputting a control order to the digital signal processing unit 400, a voltage control unit 700 for controlling a focus lens of the optical pickup 200 by a voltage applied to two ports allotted from the microcomputer 800, and an operation voltage unit for operating variably the focus lens of the optical pickup by a control signal outputted from the control unit.

The voltage control unit can be an IC (Integrated Circuit) by constructing inside of the drive unit 600.

When the two ports allotted from the microcomputer 800 are separately called as a layer VD0 and a VD1, and the voltage applied to the layer VD0 and VD1 is varied, the up/down of the inner focus lens of the optical pickup 200 is variably controlled.

The operation of the above-mentioned multilayer operation apparatus will now be described in detail with reference to accompanying FIGS. 5, 6, 7, 8, 9, and 10.

First, the layer jump from the present reproducing record layer to a superior record layer of the multilayer disk 100 will now be described.

Figure 7:
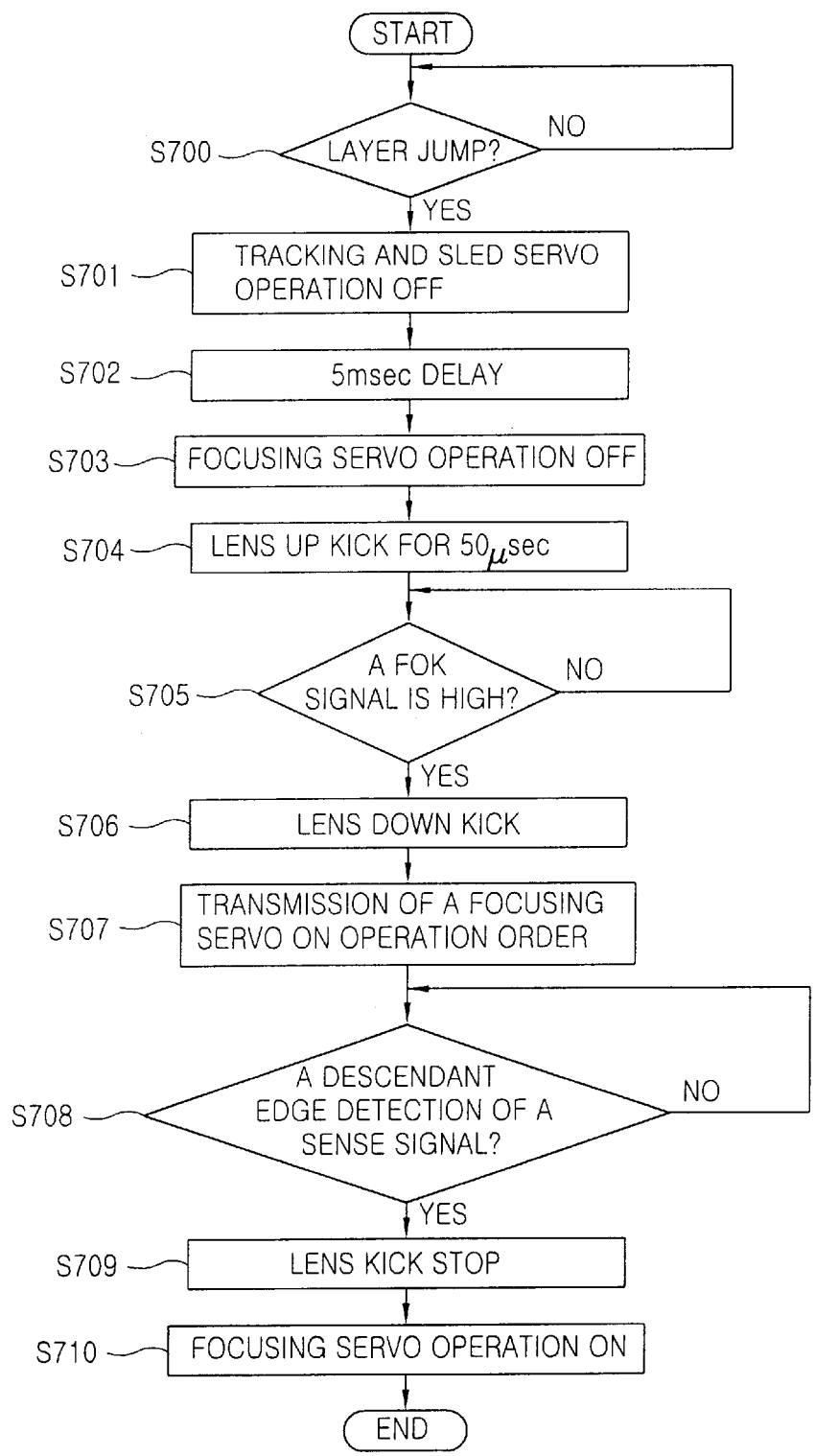
FIG. 7 is a flow chart illustrating a method for controlling jump to a superior record layer on a multilayer disk in accordance with the present invention.

FIG. 7 is a flow chart illustrating a method for controlling jump to the superior record layer on the multilayer disk in accordance with the present invention. When the jump order is inputted from outside to the microcomputer 800 S700, the microcomputer 800 turns off the tracking and sled servo operation of the optical pickup 200 S701, and delays for 5 msec in order to stabilize the optical pickup 200 S702. When the 5 msec is passed, the microcomputer 800 turns off the focusing operation of the optical pickup 200.

As described above, when the all servo operation is cut off, the microcomputer 800 transmits an order for ascending vertically the inner focus lens of the optical pickup 200 to the digital signal processing unit 400. The digital signal processing unit 400 controls the focus lens of the optical pickup 200 to ascend vertically for 50 μsec S704.

The time (50 μsec) can be varied in accordance with a kind of the optical pickup and a region of the optical disk where the optical pickup is placed, namely, inner circumference, outer circumference. In the embodiment of the present invention, the time is in layer up on the outer circumference. Later, the related description will now be described in detail.

In order to make the inner focus lens of the optical pickup 200 ascend vertically, the microcomputer 800 outputs a low level (0) value of the set port VD0 and VD1 to the voltage control unit 700. The voltage control unit 700 outputs the input level value to the drive unit 600. The drive unit 600 applies the inputted variable voltage level value to the inner actuator of the optical pickup 200. The up operation of the focus lens is performed by setting the operation voltage applied to the actuator variably.

The voltage level value applied to the set port VD0 and VD 1 by the microcomputer 800 in order to get the focus lens up/down will now be described with reference to accompanying FIG. 5.

FIG. 5 illustrates the relation of voltage level inputted to ports allotted from a microcomputer in accordance with the present invention. First, in layer up, the voltage level is separately outputted to the port VD0, VD1 as "L", an output is "0" because Q2 is an open circuit, an output voltage Vfao from the DSP is inputted as 2.6V. Herein, the voltage Va on a node a is (R1×Vfa)+(R4×Vd)/(R1+R4)=2.9V. The 2.9V is a 0.9V value on the basis of a reference voltage 2V.

In the meantime, in layer down, the two output ports are all "H", the output is "0" because the Q1 is the open circuit, the output voltage Vfao from the DSP is 0.4V.

Herein, the voltage Va on the node a is Vfao×(R2/(R2+R4)=0.2V, accordingly −1.8V value is outputted on the basis of the reference voltage 2V. In lens stop, the output is "0" because the Q1 and 02 are all open circuits.

In addition, because the focus operation voltage can be altered in accordance with the kind (manufacturer) of the pickup, there is need to find the optimum drive voltage by companies.

It will now be described with reference to accompanying FIG. 6. A credible apparatus can be embodied by altering the resistance R1, R2 values in accordance with the manufacturer of the pickup. In the present invention, the optimum condition can be satisfied by selecting a resistance having (a) value in the set test result. In other words, the output such as the drive voltage as 0.9V in the layer up, drive voltage as 1.8V in the layer down can be found by using the R1 as 82 kΩ and R2 as 22 kΩ. The output voltage Vfao from the DSP can be set as the optimum value in accordance with the circuit construction by sets, and inputting from the microcomputer is also possible.

The voltage Va outputted from the voltage control unit 700 is inputted to a drive IC, is adjusted appropriately in accordance with a gain value set in the drive IC itself, and outputs the operation voltage Vb.

As depicted in FIG. 5, the up/down of the focus lens can be controlled rapidly by controlling the voltage rapidly to the port VD0 and VD1 allotted from the microcomputer 800.

The voltage level outputted to the port VD0 and VD1 is a value set by a minus offset of the optical pickup 200.

While operating as above, the digital signal processing unit 400 outputs a FOK (Focus Okay) signal and a sense signal from the signal outputted from the RF unit 300.

Because the FOD signal and sense signals are described in the prior art, its description will now be abridged.

The microcomputer 800 observes continually the FOK signal and sense signal outputted form the digital signal processing unit 400, when the inputted FOK signal is detected as high 1 S705, the microcomputer 800 makes the focus lens descend vertically by controlling the digital signal processing unit 400 S706. In order to make the focus lens descend, the microcomputer 800 outputs the high level value to the VD0 and VD1. When the high level value is inputted to the voltage control unit, the voltage control unit adjusts appropriately the kick pulse time from the digital signal processing unit, and inputs it to the drive unit 600 in order to control speed of the focus lens of the optical pickup 200 in the up/down operation.

In addition, in the layer jump on the other record layer in the prior art, a break pulse time for decelerating the speed of the focus lens is set in order to prevent the focus lens from passing the target layer during transferring with high speed.

In addition, it is possible to output the kick/brake pulse time from the microcomputer.

The speed of the focus lens can be adjusted by setting the interval of the kick pulse time and break pulse time. The interval of the kick pulse time and break pule time can be set by a below experimental value.

In other words, the value can be altered in accordance with the manufacturer of the optical pickup and position of the present disk where the optical pickup is placed. In the experiment, when the pickup of A company is used, the kick time per disk region is altered in the layer down.

TABLE 1

|  | Layer down pulse kick time |
| --- | --- |
| Address h'30000~h'a0000 | 220 us |
| Address h'0001~h'100000 | 260 us |
| Address h'100001~ | 240 us |

In other words, the optimum value of the kick pulse region on the address (h'30000~h'a0000, inner circumference portion) in the layer down is 220 us, the optimum value of the kick pulse region on the address (h'a0001~h'100000, center portion) in the layer down is 260 us, and the optimum value of the kick pulse region on the address (h'100001~, outer circumference portion) in the layer down is 240 us. In the present invention, the layer down on the outer circumference will now be described.

By the above-described method, during descending of the focus lens, the microcomputer 800 transmits an instruction word 08 for turning on the operation of the focusing servo to the digital signal processing unit 400 S707. The microcomputer 800 observes the FOK signal and sense signal outputted from the digital signal processing unit 400. When the FOK signal is detected as high (1), the microcomputer 800 observes continually the sense signal whether the sense signal is detected as high (1). When the high sense signal outputted from the digital signal processing unit 400 is detected, the microcomputer 800 detects a descendent edge time point of the sense signal S708. When the descendent edge time point of the sense signal is detected, the microcomputer 800 transmits the order for stopping the operation of the focus lens to the digital signal processing unit 400. The digital signal processing unit 400 controls the drive unit 600 by the transmitted order.

In addition, the microcomputer 800 converts the VD0 port output value between the level values outputted separately to the port VD0 and VD1 as high level into a low (0) level value, and outputs it to the voltage control unit 700.

The voltage control unit 700 outputs the output voltage Va to the drive unit 600.

The drive unit 600 stops the operation of the focus lens by the control signal applied from the digital signal processing unit 400 and variable voltage applied from the voltage control unit 700 S709.

When the process is finished, the microcomputer 800 controls the digital signal processing unit 400 in order to perform the focusing servo operation about the target layer in accordance with the instruction word 08 for turning on the transmitted focus servo S710.

By the above process, the data on the superior record layer can be reproduced rapidly.

The embodiment of the present invention will now be described with reference to accompanying wave diagrams.

Figure 9:
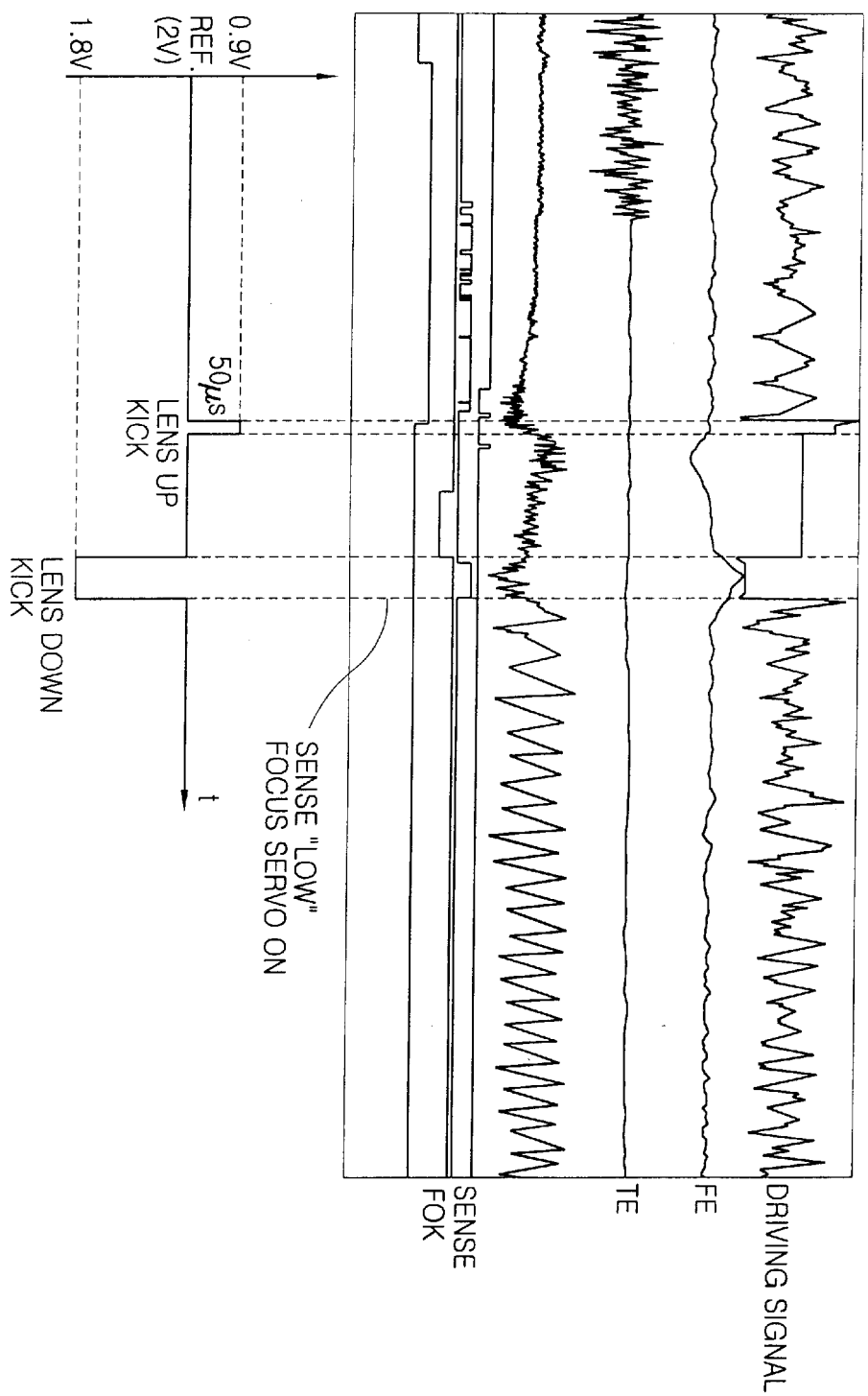
FIG. 9 is a wave diagram illustrating a signal generated in jump operation to a superior hierarchy on a multilayer disk in accordance with the present invention.

FIG. 9 is a wave diagram illustrating a signal generated in jump operation to a superior hierarchy on the multilayer disk in accordance with the present invention. When the FOK signal is detected as high during the ascending of the focus lens, the lens is descended, and the microcomputer transmits the focus servo ON order. The microcomputer 800 observes the time point of the high conversion of the sense signal, stops the lens kick at the descendent edge time point of the high sense signal, and latches the focus servo ON order.

When the kick pulse having 0.9V voltage on the basis of the reference voltage for ascending the lens for 50 us is applied and the FOK signal is outputted as high, the down kick pulse having −1.8 v voltage is applied until the descendent edge of the sense signal is detected.

The above-described description is about the layer jump request on the superior record layer in the multilayer disk operation apparatus, the operation for the layer jump request on the subordinate record layer in the multilayer disk operation apparatus will now be described as below.

Figure 8:
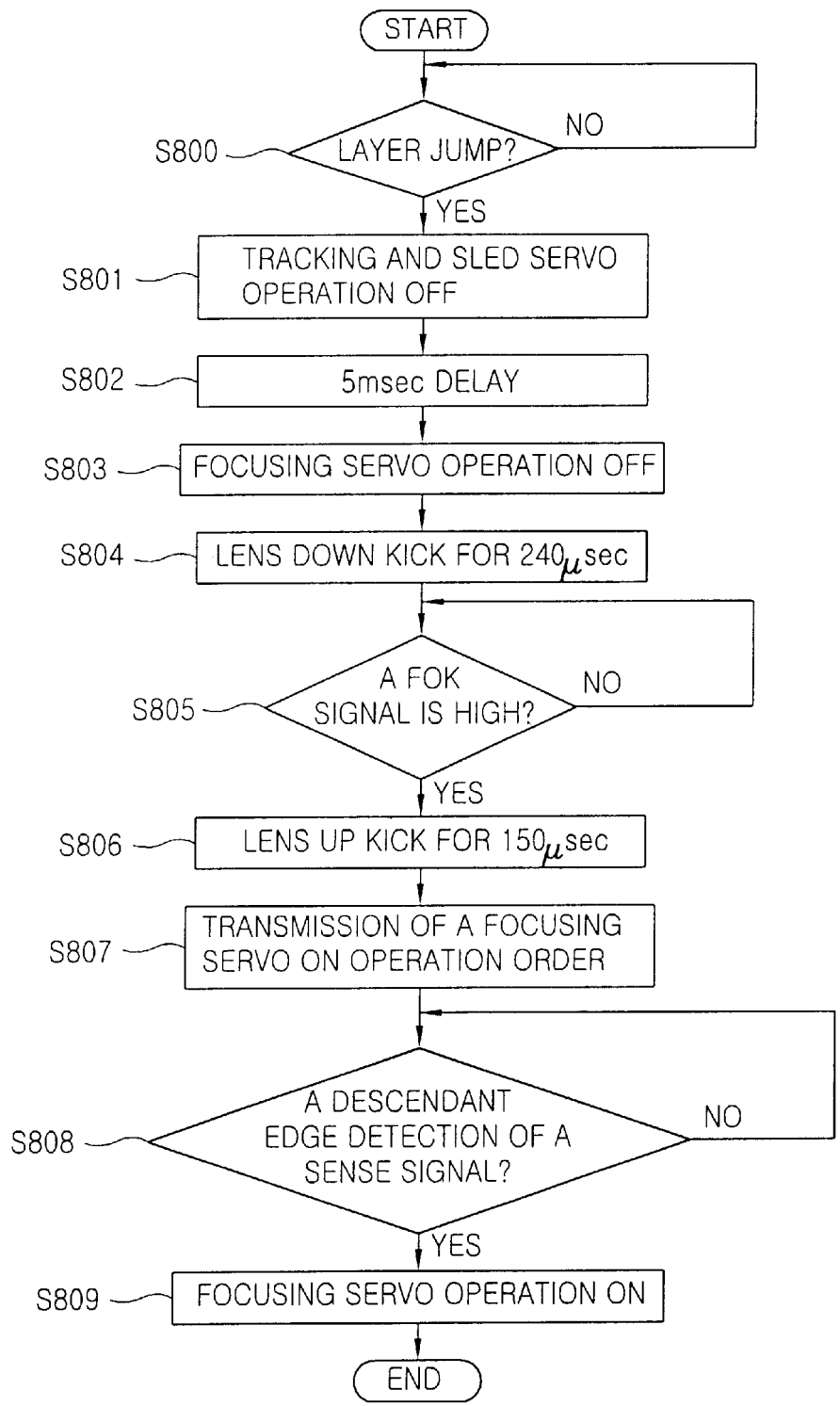
FIG. 8 is a flow chart illustrating a method for controlling jump to a subordinate record layer on a multilayer disk in accordance with the present invention.

FIG. 8 is a flow chart illustrating a method for controlling jump to a subordinate record layer on a multilayer disk in accordance with the present invention. When a jump request to the subordinate record layer of the present regenerative layer is inputted from outside to the microcomputer 800 S800, the microcomputer 800 turns off the tracking and sled and focusing servo operation as described above S801~S803. In the all servo operation off state, the microcomputer 800 controls the digital signal processing unit 400 to make the focus lens descend vertically for about 240 μsec S804.

As depicted in FIG. 5, the microcomputer 800 varies the focus operation voltage applied to the actuator by outputting separately the high level value to the VD0 and VD1, and the focus lens is descended vertically.

During the operation, when the FOK signal is outputted from the digital signal processing unit 400 as high S805, the microcomputer controls the digital signal processing unit 400 to make the focus lens ascend vertically again for 150 μsec S806, and outputs the high level value continually to the VD0 and VD1.

In addition, the microcomputer 800 transmits the instruction word 08 for turning on the focusing servo operation to the digital signal processing unit 400 S807.

The microcomputer 800 detects the ascendant edge time point of the sense signal at the FOK signal high region by observing the sense signal transmitted from the digital signal processing unit 400 S808.

When the ascendant edge time point is detected, the microcomputer 800 controls the digital signal processing unit 400 to turn on the focusing servo operation about the subordinate record layer S809, the position of the focus lens is transferred vertically to the position corresponding to the subordinate record layer of the multilayer disk, and the layer jump operation is finished.

The signal wave form generated in the layer jump on the subordinate hierarchy in the multilayer disk in accordance with the present invention will now be described with reference to accompanying FIG. 10.

Figure 10:
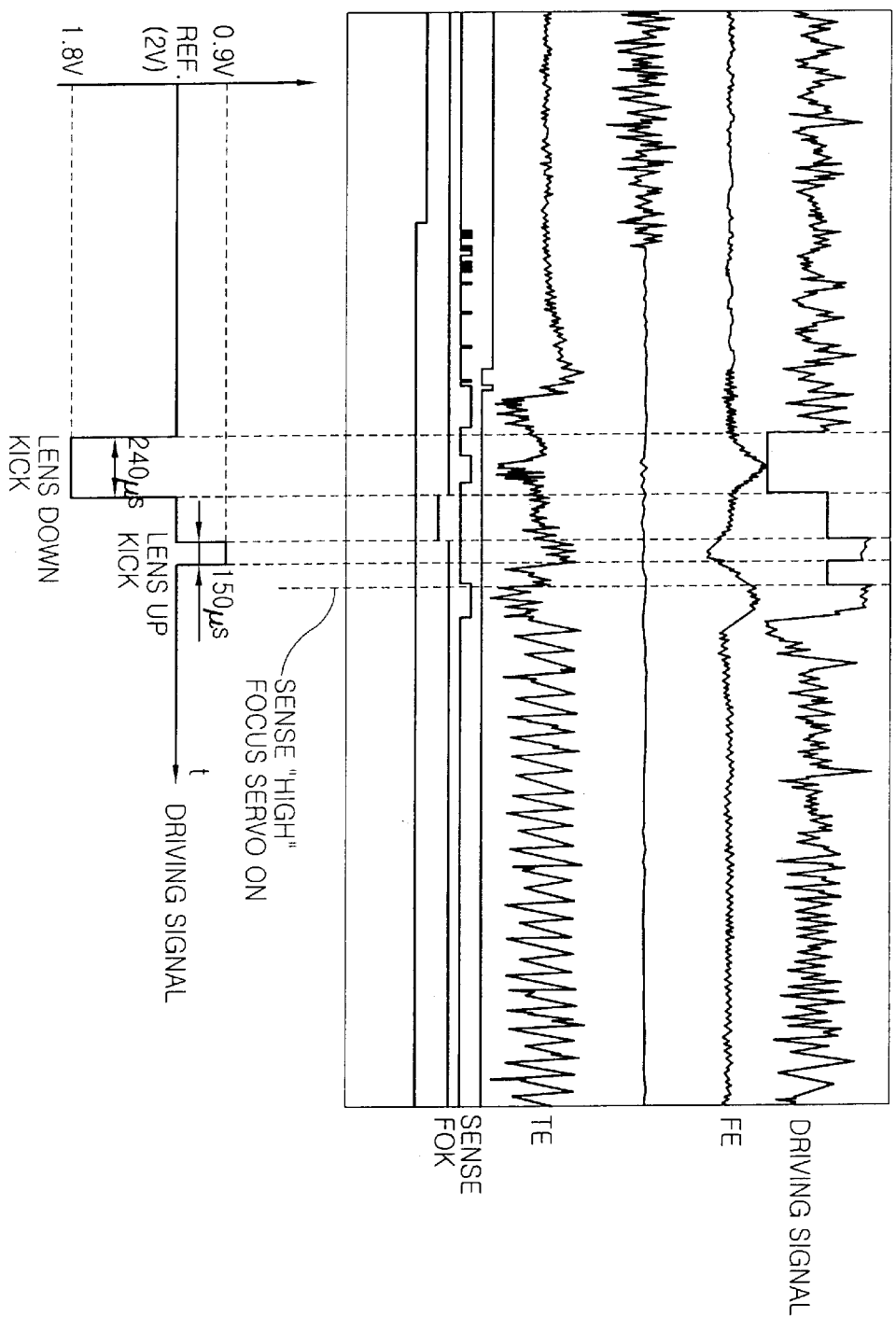
FIG. 10 is a wave diagram illustrating a signal generated in jump operation to a subordinate hierarchy on a multilayer disk in accordance with the present invention.

FIG. 10 is a wave diagram illustrating a signal generated in jump operation to the subordinate hierarchy on the multilayer disk in accordance with the present invention. When the FOK signal is detected as high during the ascendant of the focus lens, the microcomputer 800 turns on the focus servo by detecting the ascendant edge for making the sense signal as high.

The −1.8V voltage for the lens down kick is applied for 240 us, and 0.9 v voltage for lens up kick (brake) at the FOK signal high conversion time point is applied for 150 us.

Figure 11:
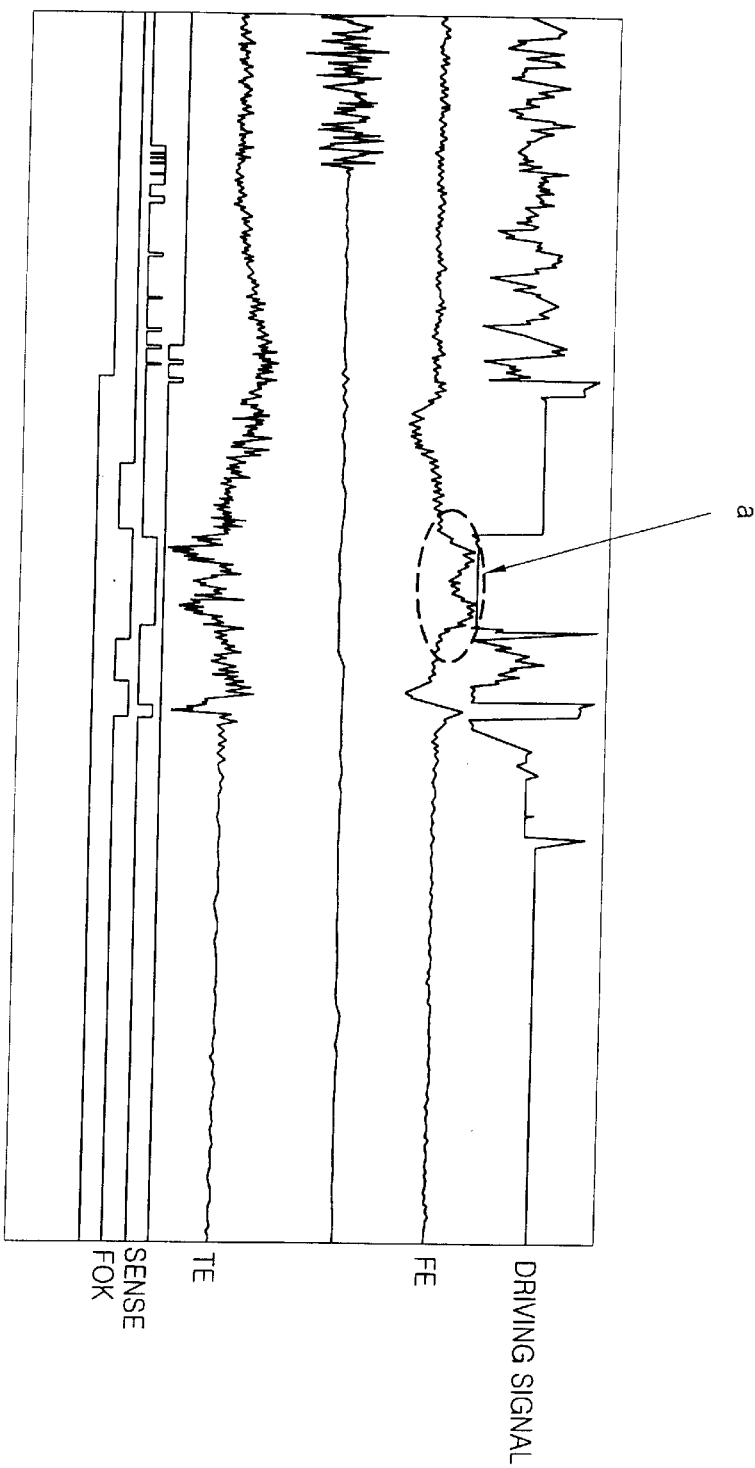
FIG. 11 is a wave diagram illustrating a signal generated in abnormal layer jump operation on a multilayer disk in accordance with the present invention.

FIG. 11 is a wave diagram illustrating a signal generated in abnormal layer jump operation on a multilayer disk in accordance with the present invention. Because the interval of the kick pulse time and break pulse time is set as 450 us on the comparison with FIGS. 9 and 10, the layer jump failure (a) occurs. As depicted in FIG. 11, when a focus error of a layer 1 is outputted, the lens down phenomenon occurs. The success or failure of the layer jump is changed only between several tens~hundreds $\mu$sec difference.

In addition, the up/down transferring of the focus lens can be adjusted by the minus offset of the optical pickup. However, because the minus offset of the optical pickup can be altered in accordance with the operation apparatus of the optical pickup, the S shape curve slope of the focusing error signal corresponding to the target layer to be focused can be suitably gentle by adjusting the kick pulse time and break pulse time appropriately by using the time point of the high/low signal of the sense signal and its width.

As described above, the present invention can perform the layer jump operation accurately and rapidly by reducing the required time for the layer jump operation as 140 msec from about 200 msec in the prior art by setting variably the operation voltage of the focus lens in the consideration of the minus offset of the optical pickup and adjusting appropriately the kick pulse time and break pule time in order to perform the layer jump operation on the multilayer disk having at least two record layers.

What is claimed is:

1. A layer jump control apparatus of a multilayer optical disk, comprising:

an optical pickup including an object lens for reading data recorded on an optical disk having at least two layers;

a digital signal processing unit for outputting a control signal for focus servo control from a signal read from the optical pickup, and restoring the original signal from the read signal;

a control unit for outputting a control order for layer jump to the digital signal processing unit, controlling a focusing operation of a target layer from the signal outputted from the digital signal processing unit in accordance with the control order, and outputting a different control signal in accordance with a target layer transferring position; and an operation voltage unit for operating variably a focus lens of the optical pickup by the control signal outputted from the control unit, wherein the signal outputted from the operation voltage unit has different voltage values as an operation voltage for subordinate layer transferring and as an operation voltage for superior layer transferring.

2. The layer jump control apparatus disk according to claim 1, wherein the digital signal processing unit outputs a FOK (Focus Okay) signal and a FZC (Focus Zero Crossing) signal in accordance with the control order outputted from the control unit, and the control unit controls transferring speed about the target layer on the basis of the FOK and FZC signals.

3. A layer jump control apparatus of a multilayer optical disk, comprising:

an optical pickup including an object lens for rending data recorded on an optical disk having at least two layers;

a digital signal processing unit for outputting a control signal for focus servo control from a signal read from the optical pickup, and restoring the original signal from the read signal;

a control unit for outputting a control order for layer jump to the digital signal processing unit, controlling a focusing operation of a target layer from the signal outputted from the digital signal processing unit in accordance with the control order, and outputting a different control signal in accordance with a target layer transferring position; and an operation voltage unit for operating variably a focus lens of the optical pickup by the control signal outputted from the control unit, wherein the break pulse time is bigger than the kick pulse time.

4. A layer jump control apparatus of a multilayer optical disk, comprising:

an optical pickup including an object lens for reading data recorded on an optical disk having at least two layers;

a digital signal processing unit for outputting a control signal for focus servo control from a signal read from the optical pickup, and restoring the original signal from the read signal;

a control unit for outputting a control order for layer jump to the digital signal processing unit, controlling a focusing operation of a target layer from the signal outputted from the digital signal processing unit in accordance with the control order, and outputting a different control signal in accordance with a target layer transferring position; and an operation voltage unit for operating variably a focus lens of the optical pickup by the control signal outputted from the control unit, wherein the kick/break pulse time is controlled in accordance with a disk region where the lens is placed presently.

5. The layer jump control apparatus of the multilayer disk according to claim 4, wherein the break pulse time is bigger than the kick pulse time.

6. A jump control apparatus of a focus lens, comprising:

a reader for reading data recorded on an optical disk having at least two layers;

a servo control unit for outputting a signal for controlling a vertical transferring time of the reader in accordance with the signal outputted from the reader;

an operation unit for operating the reader in accordance with a signal outputted from the servo control unit; and a control unit for controlling the servo control unit for focusing of the pertinent layer during a layer jump request of the disk, and controlling the operation unit for outputting a variable voltage in accordance with a target layer transferring position, wherein the variable voltage outputted from the operation unit is outputted differently in accordance with the characteristic of the reader.

7. The jump control apparatus of a focus lens according to claim 6, wherein the signal outputted from the servo control unit is a kick/brake pulse.

8. The jump control apparatus of a focus lens according to claim 7, wherein the brake pulse time is outputted longer than the kick pulse time outputted from the servo control unit.

9. The jump control apparatus of a focus lens according to claim 6, wherein the variable voltage outputted from the operation unit outputs differently a voltage which is transferred from the subordinate layer to the superior layer, and a voltage which is transferred from the superior layer to the subordinate layer.

10. A jump control apparatus of a focus lens, comprising:
   a reader for reading data recorded on an optical disk having at least two layers;
   a servo control unit for outputting a signal for controlling a vertical transferring time of the reader in accordance with the signal outputted from the reader;
   an operation unit for operating the reader in accordance with a signal outputted from the servo control unit; and
   a control unit for controlling the servo control unit for focusing of the pertinent layer during a layer jump request of the disk, and controlling the operation unit for outputting a variable voltage in accordance with a target layer transferring position,
   wherein the kick/brake pulse time is varied in accordance with the position of the reader.

11. A jump control apparatus of a focus lens, comprising:
   a reader for reading data recorded on an optical disk having at least two layers;
   a servo control unit for outputting a signal for controlling a vertical transferring time of the reader in accordance with the signal outputted from the reader;
   an operation unit for operating the reader in accordance with a signal outputted from the servo control unit; and
   a control unit for controlling the servo control unit for focusing of the pertinent layer during a layer jump request of the disk and controlling the operation unit for outputting a variable voltage in accordance with a target layer transferring position,
   wherein the kick/brake pulse time is varied in accordance with the characteristic of the reader.

12. A layer jump control method of a multilayer optical disk, comprising:
   moving an object lens of an optical pickup in accordance with a position of an optical disk layer, wherein the object lens focuses on a superior layer of the optical disk while vertically ascending to the superior layer, or the object lens focuses on a subordinate layer of the optical disk while vertically descending to the subordinate layer.

13. The method according to claim 12, wherein the lens is moved according to a kick/break pulse.

* * * * *